United States Patent
Voorhees et al.

(10) Patent No.: US 6,895,365 B2
(45) Date of Patent: May 17, 2005

(54) SYSTEMS AND METHODS FOR ANALYZING DATA OF AN SPI DATA BUS

(75) Inventors: William W. Voorhees, Colorado Springs, CO (US); William J. Schmitz, Monument, CO (US); Mark A. Slutz, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 27 days.

(21) Appl. No.: 10/423,081

(22) Filed: Apr. 25, 2003

(65) Prior Publication Data

US 2004/0215420 A1 Oct. 28, 2004

(51) Int. Cl.[7] ............................................. G06F 11/30
(52) U.S. Cl. ...................................... 702/183; 710/100
(58) Field of Search ........................................ 702/183

(56) References Cited

U.S. PATENT DOCUMENTS

| | | | |
|---|---|---|---|
| 5,457,694 A | 10/1995 | Smith | |
| 5,923,673 A | 7/1999 | Henrikson | |
| 6,111,717 A | 8/2000 | Cloke et al. | |
| 6,510,532 B1 * | 1/2003 | Pelly et al. | 714/43 |
| 6,623,062 B1 * | 9/2003 | Hoffman | 296/100.1 |
| 6,629,062 B2 | 9/2003 | Coffey et al. | |

* cited by examiner

Primary Examiner—John Barlow
Assistant Examiner—Anthony T. Dougherty
(74) Attorney, Agent, or Firm—Duft Bornsen & Fishman, LLP

(57) ABSTRACT

Systems and methods for analyzing data transferred through an SPI data bus are presented. In one exemplary preferred embodiment of the invention, an SPI data probe imitates an SPI device coupled to the SPI data bus and receives data from the SPI data bus so that the data may be analyzed. The SPI data probe transfers the data to an analysis unit without substantially altering impedance more than the SPI device would. The SPI data probe includes connectors configured for coupling the probe to the SPI data bus and for coupling the probe to an analysis unit. The SPI data probe also includes circuitry that may buffer, compensate and deskew the data as an SPI device would.

13 Claims, 2 Drawing Sheets

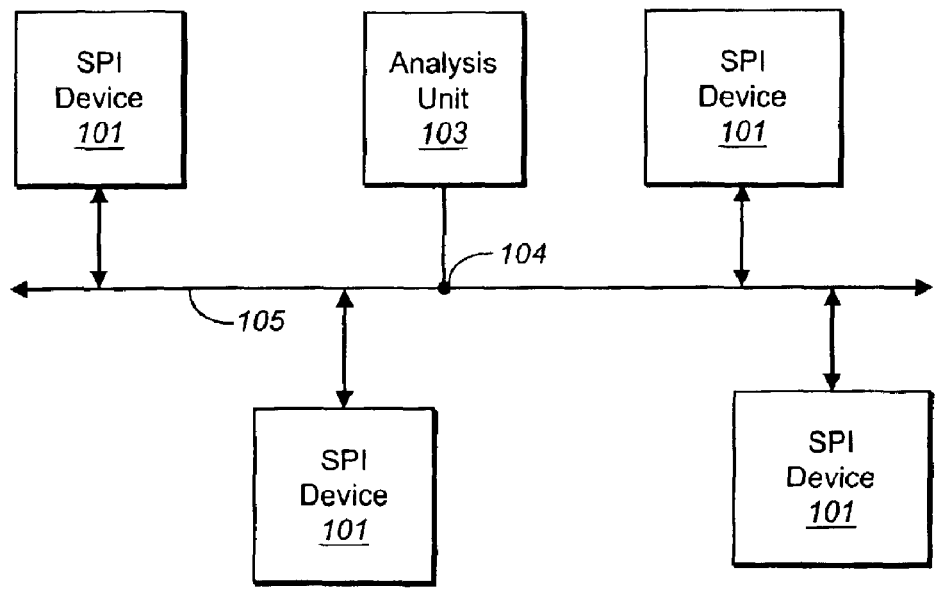
FIG._1
*(PRIOR ART)*
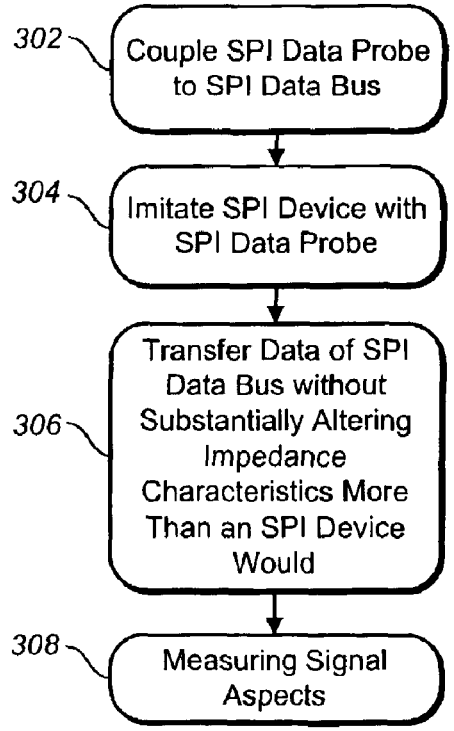
FIG._3

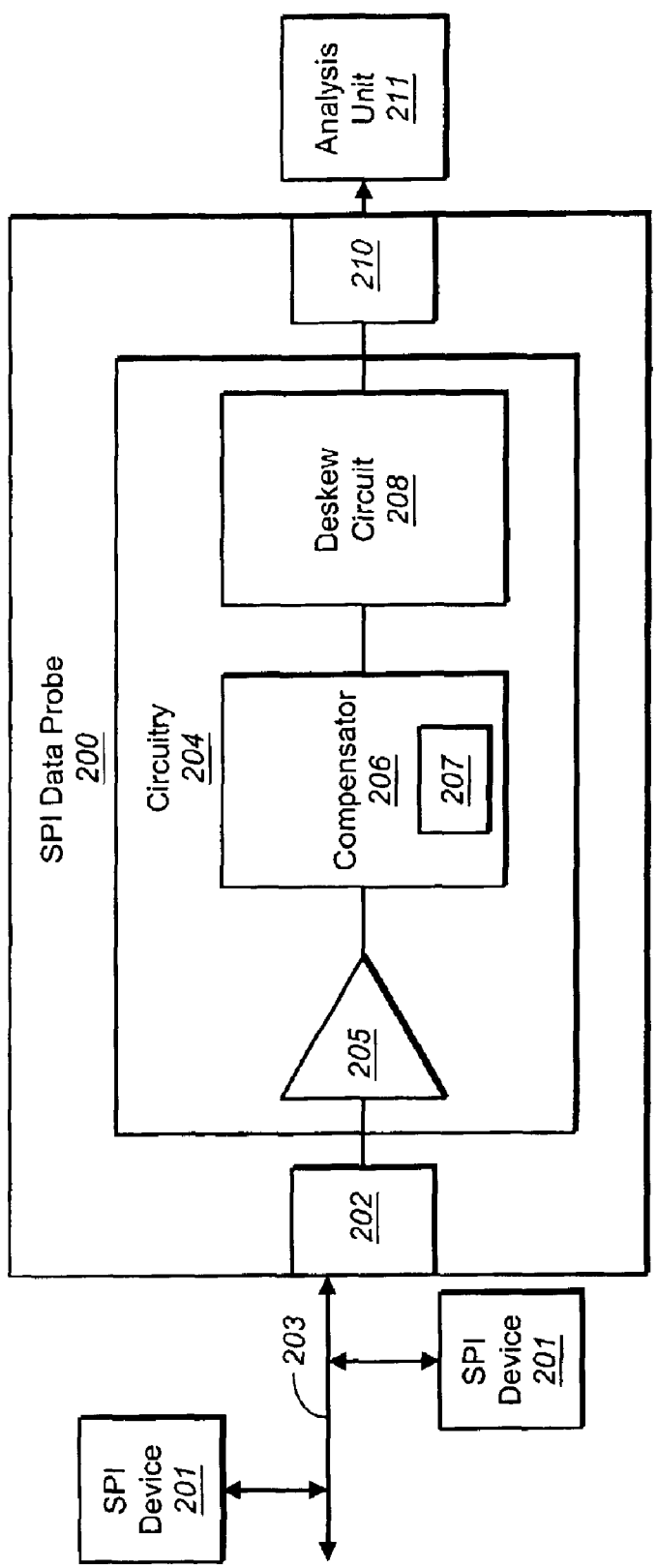
FIG._2

SYSTEMS AND METHODS FOR ANALYZING DATA OF AN SPI DATA BUS

This application is related to U.S. patent application Ser. No. 10/423,082 entitled Systems and Methods for Analyzing Data of a SAS/SATA Device (filed Apr. 25, 2003, herewith), which is incorporated herein by reference.

BACKGROUND OF THE INVENTION

1. Field of the Invention

The invention generally relates to analyzing data transferred through a parallel data bus. More specifically, the invention relates to analyzing data of an SCSI Parallel Interface (SPI) data bus using a data probe that minimizes alteration to characteristic impedance on the data bus by mimicking a front end of an SPI device and presenting a typical SPI device load to the data bus. As used herein, SCSI represents Small Computer Systems Interface.

2. Discussion of the Related Art

An SPI data bus is a data bus that transfers multiple signals over parallel conductive paths according to an SPI specification, such as SPI-4 Rev. 10 (also known as the Ultra320 specification) and SPI-5 (also known as the Ultra640 specification). The SPI specifications are generally available from: http://www.t10.org. One example of data transference through an SPI data bus includes communication to an SPI device, such as a hard disk drive (HDD). Data transfers through the SPI data bus require precise timing among various parallel signals, because timing errors, or skew, of the signals can cause, inter alia, incorrect transfers resulting in eventual data corruption. Accordingly, it is often desirable to analyze signals exchanged over the data bus to debug such timing errors.

A myriad of other reasons may exist for analyzing data transfers over a bus structure. For example, a higher level of data exchange protocol may be analyzed to identify errors in exchanged data caused by drivers or other components that drive data on the bus. Other errors may include data corruption and protocol violations from firmware, logic, cables, drivers and/or other system components.

To analyze such errors, the bus is typically monitored with an external analyzer such as a logic analyzer or customized protocol analyzer tuned to the specific signals and protocols employed. The analyzer is useful to determine signal quality and/or detect signal errors, such as timing errors and protocol related errors. Once these errors are detected, the cause of the errors can be isolated and corrective measures can be taken.

Such an analyzer is connected to the SPI data bus with either an in-line break-out board or a passive probe to view the data passing through the data bus. With the break-out board, the analyzer accesses the data by coupling the break-out board directly to the data bus. A user then selects which lines of the data bus are to be analyzed using patch-cords/wires that connect to the analyzer. A probe attaches to exposed connections of the bus (such as exposed test points intended for coupling such probes).

Most such analyzers are passive in that they do not generate signals, but rather merely monitor signals applied to the bus by other devices. With a passive probe, the analyzer accesses the data with the probe by "tapping" into the data passing through various signal paths of the bus.

Probing of data passing through the data bus often alters characteristic impedance of the data bus; these alterations typically degrade signal timing and quality such that analysis of the data is no longer valid or useful. For example, once a line of the data bus is physically selected for analysis, physical couplings of either the break-out board or the probe alters the characteristic impedance of the data bus, thereby altering the integrity of the signals passing through the bus. The altered impedance produced by such probing may be sufficient to change the nature of the problem being analyzed. Protocol, signal or timing errors may be introduced or modified by the coupling of the probe to the bus. In some instances, a physical coupling "masks" a timing error so that the error goes undetected altogether.

It is evident from the above discussion that there is an ongoing need to provide improved methods and structures for analyzing data transferred through an SPI data bus.

SUMMARY OF THE INVENTION

The present invention solves the above and other problems and advances the state of the useful arts by providing systems and methods for analyzing data transferred through parallel data bus. More specifically, the present invention assists in analyzing data using an SPI data probe that minimizes alteration of characteristic impedance by mimicking a front end of an SPI device and presenting a typical SPI device load to the data bus.

In one exemplary preferred embodiment of the invention, an SPI data probe imitates an SPI device load coupled to the SPI data bus and receives data from that bus so that the data may be analyzed. In accordance with SPI specifications, such a device may include deskew logic to adjust timing of signals within specified limits of the SPI bus specification. The SPI data probe may include connectors configured for coupling the probe to the SPI data bus and for coupling the probe to an analysis unit. The SPI data probe may also include circuitry that imitates an SPI device and transfers the data to the analysis unit without substantially altering impedance more than the SPI device would.

In one aspect of the invention, an SPI data probe comprises: a bus connector configured for coupling to an SPI data bus; an analysis connector configured for coupling to an analysis unit; and circuitry coupled between the bus connector and the analysis connector and configured for receiving data of the SPI data bus and for imitating an SPI device to transfer the data to the analysis unit without substantially altering impedance more than the SPI device would.

In another aspect of the invention, the circuitry comprises a buffer communicatively coupled to the bus connector and configured for receiving the data.

In another aspect of the invention, the circuitry further comprises a compensator communicatively coupled to the buffer and configured for conditioning the data before analysis by the analysis unit.

In another aspect of the invention, the compensator comprises one or more of an adaptive filter and a glitch filter configured for filtering the data received by the buffer.

In another aspect of the invention, the circuitry further comprises a deskew circuit communicatively coupled to the compensator and configured for adjusting timing of the data.

In another aspect of the invention, the data comprises Ultra320 SCSI data.

In another aspect of the invention, the circuitry is further adapted to passively probe the data and present an SPI device loading to the SPI data bus.

In another aspect of the invention, the circuitry is further adapted to actively probe the data by exchanging protocols with SPI devices coupled to the SPI data bus.

In one aspect of the invention, a method of analyzing data transferred through an SPI data bus comprises steps of: coupling to the SPI data bus; imitating an SPI device using an SPI data probe; transferring data of the SPI data bus through the SPI data probe without substantially altering impedance more than the SPI device would; and measuring aspects of the data.

In another aspect of the invention, the step of transferring comprises a step of buffering the data with the SPI data probe.

In another aspect of the invention, the step of transferring comprises a step of conditioning the data before analysis.

In another aspect of the invention, the step of conditioning the data includes a step of adaptively filtering to generate output data based on characteristics of received data.

In another aspect of the invention, the step of transferring comprises a step of deskewing the data to adjust timing of the data.

In another aspect of the invention, the step of imitating comprises a step of presenting an SPI device loading to the SPI data bus.

In another aspect of the invention, the step of imitating comprises a step of exchanging protocols with SPI devices coupled to the SPI data bus.

BRIEF DESCRIPTION OF THE DRAWINGS

FIG. 1 illustrates a coupling of a prior art SPI data probe.

FIG. 2 shows an SPI data probe in an exemplary preferred embodiment of the invention.

FIG. 3 shows a block diagram illustrating steps involved with analyzing data of an SPI data bus in an exemplary preferred embodiment of the invention.

DETAILED DESCRIPTION OF THE DRAWINGS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

FIG. 1 illustrates a coupling of a prior art SPI data probe at connection point 104. Devices 101 communicate data to one another through an SPI data bus 105. An example of such a communication may include that of storage controllers and storage devices, such as one-inch HDDs. Analysis of the data is often necessary to detect and debug data transfer and protocol errors. Here analysis unit 103 analyzes the data by electrically coupling to SPI data bus 105 with a passive probe at connection point 104. This coupling illustrates an intrusive form of external analysis that can create skew or noise errors because, among other reasons, the coupling includes inherent impedance that can alter signal quality and/or timing of data. Occasionally, the errors being debugged are even masked because altered impedance attributed to the coupling may inadvertently compensate a signal such that errors go undetected altogether.

Here, the probe couples to SPI data bus 105 at connection point 104 and allows analysis unit 103 to view the data passing between devices 101 by intrusively looking into the data bus. This intrusion alters impedance to SPI data bus 105 because, among other reasons, the probe at connection point 104 includes internal impedance in its connection and/or in the data line between the probe and analysis unit 103. Accordingly, this intrusion into the data line may corrupt the data by altering impedance to the line, as impedance often affects signal integrity.

The probe at connection point 104 may be either an in-line break-out board or a passive probe that "taps" the data passing through data bus 105. The probe attaches to exposed connections of the bus, such as exposed test points intended for coupling such probes. With the break-out board, analysis unit 103 accesses the data by coupling the break-out board directly to data bus 105. A user then selects which lines of data bus 105 are to be analyzed using patch-cords/wires that connect to analysis unit 103.

Analysis unit 103 couples to the probe and receives the data through this intrusive tap and analyzes the data according to a variety of well-known methods. For example, analysis unit 103 may be a logic analyzer for analyzing data or analysis unit 103 may be a protocol analyzer for analyzing protocols exchanged between devices 101. Since the data may be influenced by altered impedance of this intrusive probing of SPI data bus 105, analysis of the data is untrustworthy and substantially useless for debug purposes.

FIG. 2 shows an exemplary preferred embodiment of the invention in SPI data probe 200. SPI data probe 200 is configured to pass data from SPI data bus 203 to analysis unit 211 for analysis. The data may be of one or more SPI devices, such as SPI devices 201, coupled to SPI data bus 203. SPI data probe 200 is communicatively coupled to SPI data bus 203, and, as such, SPI data probe 200 may passively monitor data passed along SPI data bus 203. SPI data probe 200 may essentially mimic an actual SPI device by presenting an impedance to SPI data bus 203 that is characteristic of another SPI device coupled to the bus (e.g., imitating circuit loading of another SPI device). Analysis unit 211 may, therefore, analyze typical communications of SPI devices 201 that are unaffected by passive probing.

SPI data probe 200 includes bus connector 202 configured for coupling to SPI data bus 203 and analysis connector 210 configured for coupling to analysis unit 211. In one embodiment, SPI data probe 200 includes circuitry 204 coupled between bus connector 202 and analysis connector 210. Circuitry 204 may be configured for receiving data of SPI data bus 203 (e.g., the data passed by SPI devices coupled thereto) and for imitating an SPI device, such as an HDD. As such, circuitry 204 may transfer the data to analysis unit 211 without substantially altering impedance more than an SPI device would.

One reason that SPI data probe 200 minimizes impedance alterations includes its ability to innately maintain an impedance of a typical SPI device. For example, circuitry 204 may include buffer, compensation and deskew circuitry (e.g., components 205, 206 and 208) that essentially mimics a "front-end" of an Ultra320 SCSI by maintaining circuit loading (e.g., impedance) within SPI-4 specifications. Circuitry 204 may incorporate such functionality in an integrated circuit that allows for design implementations in which circuit trace length is minimized. As an integrated circuit, circuitry 204 may be substantially integrated with a circuit design such that shorter conductive traces of the circuit design may be used to couple circuitry 204 to bus connector 202 and to analysis connector 210. Such an implementation may minimize "loading" (e.g., impedance) of SPI data probe 200 since circuit traces typically add impedance to a circuit. In one embodiment, loading of SPI data probe 200 is maintained so as to substantially present loading of a single one-inch HDD to SPI data bus 203 (e.g., maintained within the SPI-4 specification).

One aspect of mimicking by SPI data probe 200 may be implemented by simulating timing delays of a typical SPI device, such as any of SPI devices 201. Accordingly, in one embodiment, circuitry 204 may include buffer 205 communicatively coupled to bus connector 202 and configured for receiving the data. Buffer 205 may be constructed in a variety of well-known ways and may maintain timing of a signal as received by a typical SPI device.

Impedance inherent to SPI data bus 203 and/or the coupling of SPI devices 201 to SPI data bus 203 may affect signal quality of received data; thus, in another embodiment, circuitry 204 may include compensator 206 communicatively coupled to buffer 205. Compensator 206 may condition received data signals to improve signal quality of the signals before analysis by analysis unit 211. For example, compensator 206 may receive data signals from buffer 205 and shape those signals in the event that the data was corrupted through SPI data bus 203 (e.g., corrupted through inherent impedance of the data bus). Accordingly, compensator 206 may include filter 207 to filter out-of-band noise from the signals that may have been caused by such bus impedance. Filtering by filter 207 may be performed in a variety of well-known manners, such as adaptive filtering and/or glitch filtering. Glitch filtering, as used in herein, is a method of filtering to eliminate the effect of "glitch" pulses (e.g., pulses having pulse widths that are invalid with respect to the SPI specification).

In one embodiment, circuitry 204 receives Parallel Protocol Requests (PPR) of one or more SPI devices, such as SPI devices 201, coupled to SPI data bus 203 to determine if the SPI device is conditioning data signals. Based on a state of conditioning for a particular transaction between SPI devices, SPI data probe 200 may condition received data signals using components 206 and 207. For example, if SPI data probe 200 detects PPR messages from an SPI device 201 indicating that the device is pre-compensating or adaptively filtering transmitted signals, then SPI data probe 200 may not activate compensator 206. Alternatively, if SPI data probe 200 detects no such indication, then SPI data probe 200 may compensate the signal and/or adaptively filter the signal to improve signal integrity for reasons stated above.

Additionally, skew, or timing errors, may result from a myriad of reasons, such as extended distances between devices connected to SPI data bus 203 and impedances within the data bus. As skew of the data signals can corrupt communication between SPI devices, circuitry 204 may include, in another embodiment, deskew circuit 208. Deskew circuit 208 may "shadow" training sequences of one or more SPI devices 201 by monitoring protocol exchanges of the devices and storing training sequences of the SPI devices based on an identification of each device. For example as two SPI devices are "training" with one another, the devices may exchange device identifiers so that each device knows the identity of a device it is in communication therewith. Accordingly, deskew circuit 208 may store information about the training sequences based on each device identifier. Such information may include timing errors in protocol exchanges between devices. Deskew circuit 208 may copy these timing errors and thereby construct a deskew table to deskew, or correct, the timing errors when they are again encountered. As used herein, training sequences refer to protocol exchanges between devices and/or other types of "handshaking" between devices that may establish signal timing parameters between the devices.

In another embodiment, SPI data probe 200 may further mimic an SPI device by exchanging protocols with SPI devices 201 coupled to SPI data bus 203. In such an "active probe" embodiment, SPI device probe 200 may emulate protocol exchanges of a Small Computer System Interface (SCSI) device, such as an Ultra320 SCSI device or other SCSI device. Additionally, SPI data probe 200 may pre-compensate signals just as another SPI device would and indicate as much using similar PPR messaging. Information regarding various SCSI types can be generally obtained from http://www.t10.org with more specific information regarding Ultra320 SCSI devices being generally obtained from:

ftp://ftp.t10.org/t10/drafts/spi4/spi4r10.pdf.

In yet another embodiment, SPI data probe 200 may include front-end connectors that are configured for probing signals of SPI devices or other parallel devices connected through a system back-plane. As used herein, a back-plane is a connection panel for a rack of devices typically using the same communication medium. Such a rack of devices may include, but not be limited to, a JBOD, as is known to those skilled in the art.

The embodiment of FIG. 2 should not be limited to the number of devices shown. Rather, those skilled in the art will recognize that any number of devices may be communicatively coupled to SPI data bus 203 such that SPI data probe 200 may analyze data of all or some of the devices.

FIG. 3 shows a block diagram illustrating steps involved with analyzing data of an SPI data bus in an exemplary preferred embodiment of the invention. An SPI data probe, such as SPI data probe 200 of FIG. 2, is coupled to an SPI data bus in step 302. Upon coupling, the SPI data probe imitates an SPI device in step 304. Such an imitation may include mimicking the characteristic impedance of a typical SPI device as coupled to the data bus. In another embodiment, SPI device imitation may further include the SPI data probe emulating protocol exchanges, such as training sequences, with an SPI device via the SPI data bus such that the SPI device "believes" that the SPI data probe is also an SPI device.

Data transmitted on the SPI data bus, as probed by the SPI data probe, is transferred by the SPI data probe to an analysis unit, such as analysis unit 211 of FIG. 2, in step 306. This probing and subsequent data transfer does not substantially alter the impedance placed on the SPI data bus more than another SPI device would, because, inter alia, the SPI data probe provides the characteristic impedance of an SPI device to the data bus. For example, the SPI data probe may mimic an SPI device by maintaining circuit loading (e.g., impedance) within SPI-4 specifications, as described above.

While in the step of transferring, data signals may be conditioned to counter degrading effects of transference through the SPI data bus. Such effects may be the result of impedance inherent to the data bus or the result of some other signal degradation. In conditioning the signal, the SPI data probe may filter the data signals according to any well-known filtering methods (e.g., adaptively filter, glitch filter, etc.). Additionally, the step of transferring may include a step of deskewing the data to adjust timing of the data. Such a step of deskewing may include constructing a deskew table from timing parameters determined in training sequences between SPI devices. Afterwards, data signals may be deskewed according to the deskew table.

Once the data is transferred, the analysis unit may analyze the data by measuring certain aspects of the data in step 308. For example, the analysis unit may be a logic analyzer or a protocol analyzer that determines timing errors, data errors, and/or protocol errors in received signals. Additionally, the analysis unit may view aspects of signal quality, such as amplitude and noise interference.

Advantages of the above mentioned embodiments include non-intrusive probing of a parallel data bus that imitates the characteristic impedance, or loading, of a device typically connected to such a bus. Other advantages include an ability to shape, filter, and/or otherwise compensate received signals such that an analysis unit may view data as it would be received by an SPI device.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. An SPI data probe, comprising:
    a bus connector configured for coupling to an SPI data bus;
    an analysis connector configured for coupling to an analysis unit; and circuitry coupled between the bus connector and the analysis connector and configured for receiving data of the SPI data bus and for imitating an SPI device to transfer the data to the analysis unit without substantially altering impedance more than the SPI device would, wherein the circuitry includes a deskew circuit configured for adjusting timing of the received data.

2. The SPI data probe of claim 1, wherein the data comprises Ultra320 SCSI data.

3. The SPI data probe of claim 1, wherein the circuitry is further adapted to passively probe the data and present an SPI device loading to the SPI data bus.

4. The SPI data probe of claim 1, wherein the circuitry is further adapted to actively probe the data by exchanging protocols with SPI devices coupled to the SPI data bus.

5. The SPI data probe of claim 1, wherein the circuitry comprises a buffer communicatively coupled to the bus connector and configured for receiving the data.

6. The SPI data probe of claim 5, wherein the circuitry further comprises a compensator communicatively coupled to the buffer and configured for conditioning the data before analysis by the analysis unit.

7. The SPI data probe of claim 6, wherein the compensator comprises one or more of an adaptive filter and a glitch filter configured for filtering the data received by the buffer.

8. A method of analyzing data transferred through an SPI data bus, comprising steps of:
    coupling to the SPI data bus;
    imitating an SPI device using an SPI data probe;
    transferring data of the SPI data bus through the SPI data probe without substantially altering impedance more than the SPI device would wherein the step of transferring comprises a step of deskewing the data to adjust timing of the data; and
    measuring aspects of the data.

9. The method of claim 8, wherein the step of transferring comprises a step of buffering the data with the SPI data probe.

10. The method of claim 8, wherein the step of imitating comprises a step of presenting an SPI device loading to the SPI data bus.

11. The method of claim 8, wherein the step of imitating comprises a step of exchanging protocols with SPI devices coupled to the SPI data bus.

12. The method of claim 8, wherein the step of transferring comprises a step of conditioning the data before analysis.

13. The method of claim 12, wherein the step of conditioning the data includes a step of filtering the data to remove glitch pulses from the data.

* * * * *